Dec. 11, 1956  R. L. GLOVER  2,773,926
DRY CELL

Filed March 12, 1953  3 Sheets-Sheet 1

INVENTOR
ROLAND L. GLOVER
BY
ATTORNEY

INVENTOR
ROLAND L. GLOVER
BY
John F. Hohmann
ATTORNEY

Dec. 11, 1956 R. L. GLOVER 2,773,926
DRY CELL

Filed March 12, 1953 3 Sheets-Sheet 3

INVENTOR
ROLAND L. GLOVER
BY
John F. Holmann
ATTORNEY

United States Patent Office 2,773,926
Patented Dec. 11, 1956

2,773,926

DRY CELL

Roland L. Glover, Islington, Toronto, Ontario, Canada, assignor to Union Carbide Canada Limited, a corporation of Canada Application March 12, 1953, Serial No. 341,918

2 Claims. (Cl. 136—107)

This invention relates to primary galvanic cells and refers more particularly to so-called "dry cells" of the type widely used for portable devices such as flashlights, radios and the like.

One of the most difficult problems to engage the attention of manufacturers of cells of this type is that of preventing leakage from the cells during and after discharge. Much time, money, and effort have been spent on this problem and suggestions for its solution abound in the art. Such suggestions have ranged from that of confining such cells in rigid steel or plastic outer containers to that of completely re-vamping cell construction. While many of these suggestions have been effective at least to some degree, all have inherent disadvantages. In some cases, notably where an extra-heavy container for the cell is provided, it has been necessary to make the cell somewhat smaller so that its overall dimensions including the container will not exceed accepted size standards. In other cases the expedients proposed have added so much to the cost of manufacture that they are unattractive commercially. The leakage problem is therefore still a vexing one.

It is the principal object of this invention to provide a satisfactory answer to this problem. More specifically, it is an object of the invention to provide a substantially leakproof dry cell which is free of the disadvantages of previously proposed cells of this type.

The invention, by means of which these objects are achieved, comprises a dry cell having a cupped consumable metal electrode, a non-consumable carbon electrode embedded in a depolarizing mix, and an immobilized electrolyte in contact with the consumable electrode and depolarizer mix, which cell is provided with a substantially leakproof container comprising a multi-ply jacket adjacent to the consumable electrode and having metallic top and bottom closure members in liquid-tight sealing engagement with the ends of the jacket and which in cooperation with the jacket close the cell and effectively prevent escape of liquid outside of the container.

Figure 1:
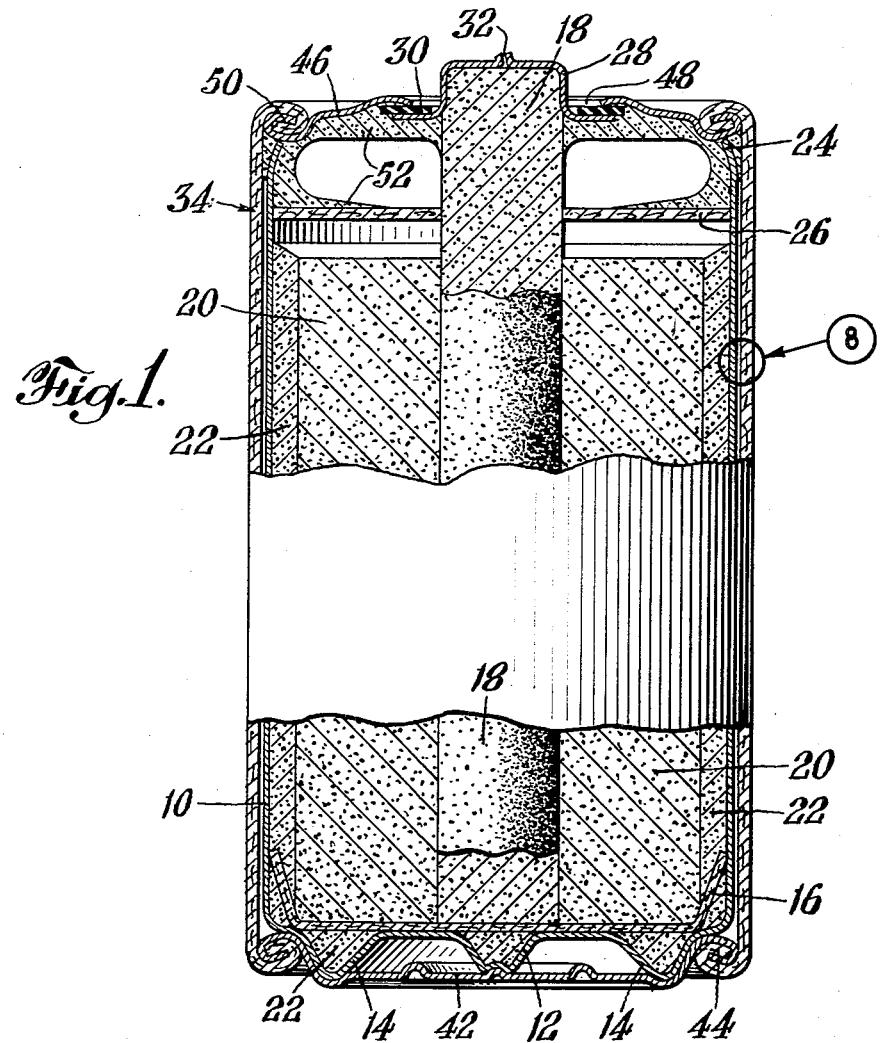
Figure 6:
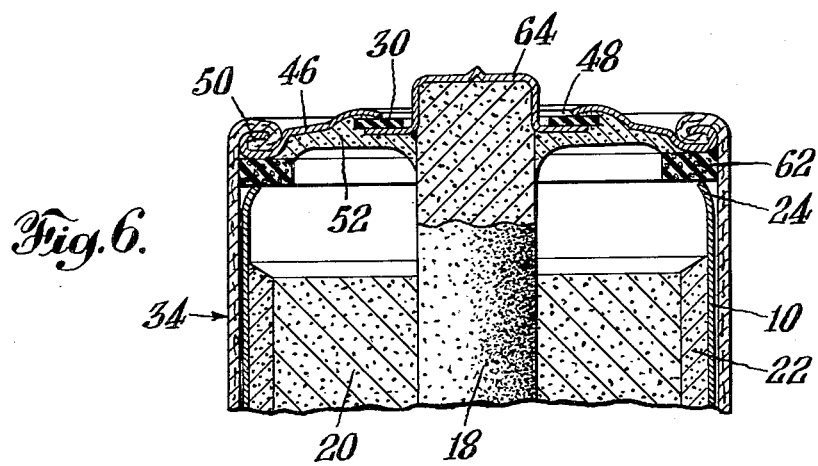
Figure 7:
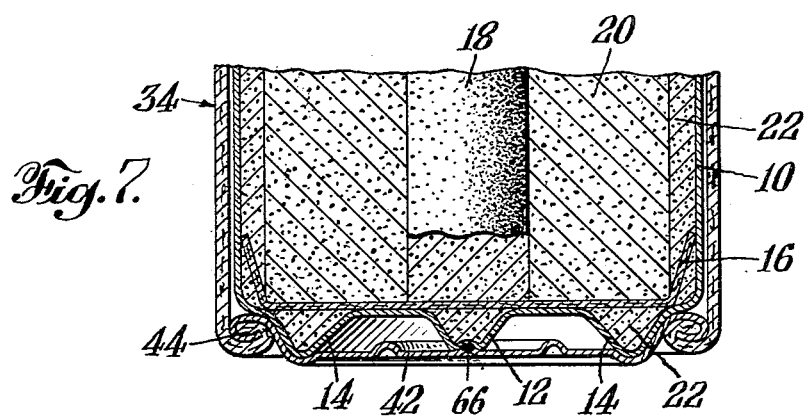
Figure 8:
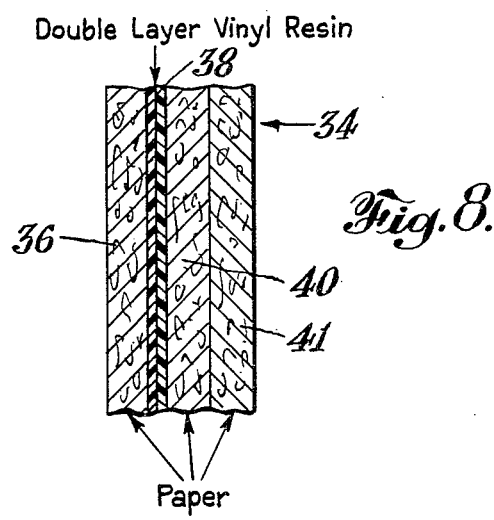

In the accompanying drawing:

Fig. 1 is a view in vertical section of a dry cell embodying the invention;

Figs. 2 to 6 inclusive are sectional views of the top portion of dry cells of alternate construction embodying the invention;

Fig. 7 is a sectional view of the bottom portion of a cell embodying the invention having an alternate construction; and Fig. 8 is an enlarged sectional view of a portion of the jacket utilized in the cells illustrated in Figs. 1 through 7.

Referring to Fig. 1 of the drawing, a substantially leakproof dry cell embodying the invention comprises a cupped consumable metal (e. g. zinc) electrode 10, the bottom of which is outwardly deformed at its outer portion 12 and annularly outwardly deformed between the side walls and center portion 12 as indicated at 14. An electrically insulating bottom washer 16 is provided within the electrode 10 and resting upon it are a centrally located non-consumable carbon electrode 18 and a mass of depolarizer mix 20 in which the carbon electrode 18 is embedded. Separating the depolarizer mix 20 from the cupped electrode 10 is a layer 22 of immobilized electrolyte. The top edges of the cupped electrode 10 are turned slightly inward as indicated at 24, and the top of the carbon electrode extends beyond the top of the electrode 10. In the construction illustrated in Fig. 1, a top washer or collar 26 is placed about the carbon electrode 18 somewhat below the top of the electrode 10, but if desired, this may be omitted as shown for instance in Fig. 2. Atop the carbon electrode 10 (Fig. 1) is a flanged metal (e. g. brass) cap 28 carrying an insulating washer 30 and provided with a central venting aperture 32.

A multi-ply jacket 34 is provided about the outside of the cupped electrode 10. The innermost ply 36 (see in enlarged detail in Fig. 8) of the jacket 34 adjacent to the electrode 10 is composed of bibulous material such as kraft or other paper. An intermediate barrier ply 38 is composed of electrolyte-impervious organic resin for instance a polymer or copolymer of a vinyl derivative. Adjacent to the barrier ply 38 is another ply 40 to which is applied a similar ply 41, both the plies 40 and 41 being composed of electrically non-conductive material such as kraft or other paper, which serves to support the barrier ply and to provide adequate strength for the jacket 34 when the innermost ply 36 becomes wet with cell exudate. Additional plies may of course be provided if desired. The bottom of the jacket 34 is provided with a metallic (suitably tin-plated steel) closure 42, the edges of the closure 42 and the bottom edges of the jacket 34 being curled in liquid-tight fashion as indicated at 44. The configuration of the bottom closure 42 is such that the closure is in contact with the outwardly deformed portions 12, 14 of the cupped electrode 10. As illustrated in Fig. 7 the bottom closure 42 may be attached to the bottom of the electrode 10 by spot welding or soldering as indicated at 66.

The top of the jacket 34 is similarly provided with a metallic closure 46, which as illustrated in Fig. 1 may have a central opening 48 through which the metal cap 28 on the carbon electrode 18 extends, the inner edges of the closure 46 engaging the washer 30 carried by the cap 28. The top edges of the jacket 34 and the outer edges of the closure 46 are curled in liquid-tight fashion as shown at 50. Underlying the closure 46 and the metal cap 28 to protect them from corrosive action of the electrolyte or of cell exudate, is a layer 52 of electrolyte-proof material such as microcrystalline wax. The wax layer 52 extends partially along the upper walls of the cupped electrode 10 on both sides thereof.

Figure 2:
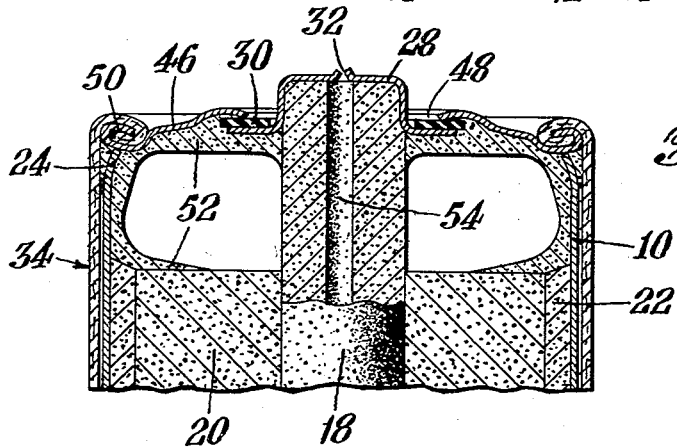

As has been indicated above, several modifications of the construction illustrated in Fig. 1 are possible. For instance, in the construction shown in Fig. 2 no top washer is employed and the inner lining 52 of wax or like material extends downwardly to the top of the depolarizer mix 20 although it does not completely overlie the mix. Also in Fig. 2 is illustrated a carbon electrode 18 having a central bore 54 to aid in venting gas from the cell. A bored electrode of this type may be employed to advantage in any of the constructions illustrated in the drawings, and its use is therefore not limited to the cell illustrated in Fig. 2.

Figure 3:
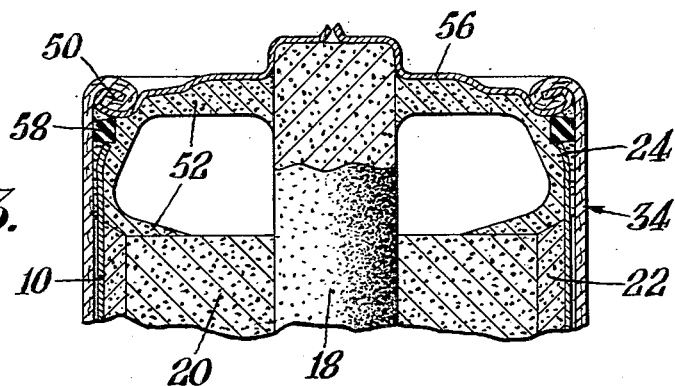

In the construction illustrated in Fig. 3, a one piece metal closure 56 is provided for the jacket 34. The use of a unitary closure requires an insulating ring 58 to insulate the closure from the cupped electrode 10 since the closure makes direct electrical contact with the carbon electrode 18.

Figure 4:
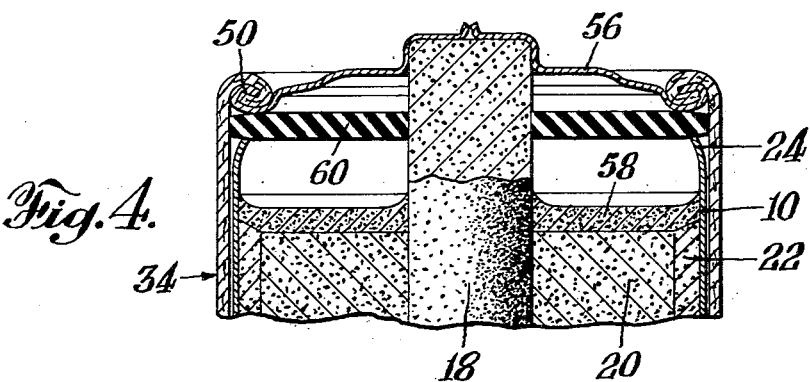
Figure 5:
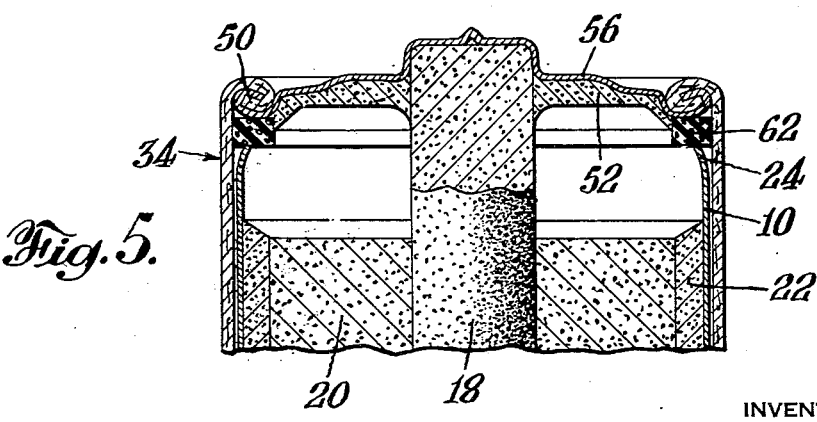

In some cases it may be desirable that the cell be provided with an internal seal. Such construction is illustrated for example in Fig. 4, in which a layer 58 of sealing material such as asphalt or wax or the like is provided atop the depolarizer mix 20 and extending from the inner walls of the cupped electrode 10 to the carbon electrode 18. Also illustrated in Fig. 4 is a modification of the construction shown in Fig. 3 in which an insulating collar 60 separates the one-piece closure 56 from the cupped electrode 10, the collar extending inwardly into contact with the carbon electrode 18.

The constructions described all utilize a central venting aperture in the metal element in contact with the carbon electrode. It is possible to omit this aperture and may be desirable. In such case a construction such as that shown in Fig. 5 may be employed. A gas-pervious washer 62 separates the metal closure 56 from the cupped electrode 10, and the electrolyte-proof layer 52 of wax extends only along the inside of the closure. The venting path is through the washer 62, along the jacket 34 and to the curled edges 44 (not shown in Fig. 5) and 50 of bottom and top closures of the jacket 34 which, although liquid-tight are not gas-tight. Fig. 6 illustrates this type of construction adapted to use with the type of top closure 46 shown in Fig. 1 with a separate metal cap 64 atop the carbon electrode 18 carrying the insulating washer 30 in which the inside edges of the closure 46 rest.

In dry cells embodying the present invention, should perforation of the cupped electrode 10 occur and liquid be exuded through such perforation, the liquid is absorbed by the bibulous innermost ply 36 of the jacket 34. The intermediate electrolyte-impermeable ply 38 prevents transmission of liquid to the outer plies 40 and 41. The prevention of moisture transmission to the outermost ply is important not only in the sense that the container formed by the jacket 34 and its metallic closures is leakproof, but equally important it tends to prevent crystallization of reaction products between the outer walls of the cupped electrode 10 and the innermost ply 36 of the jacket 34 which would occur if the exudate were permitted to dry. Since such crystallization produces substantially voluminous products, it would cause the jacket to bulge if it occurred and would thus defeat the purpose of the invention.

The outer plies 40 and 41 of the jacket 34 being protected against moisture by the intermediate ply 38 serve to support the latter and to provide adequate strength for the jacket 34 even when the innermost ply 36 is saturated with cell exudate. Although the outer plies may be of the same bibulous material, suitably kraft paper, as the innermost ply, so effective is the moisture barrier provided by the intermediate ply that the outer plies remain completely dry.

The provisions for venting of gas through the carbon electrode 18 illustrated for example in Fig. 1 and Fig. 6 are important, for if gas is not vented continuously, substantial pressure may be built up within the cell and thus cause a sudden rupture of the cupped electrode and consequent bulging of the jacket. For extremely heavy duty service, it may be advantageous to provide the carbon electrode with a central bore as shown in Fig. 2.

Still another protection against leakage and bulging is provided by the construction of the invention at the bottom closure of the cell container. The bottom of the cupped electrode 10 as has been explained above is provided with an outwardly extending projection at its center portion 12 and with an outwardly extending annular projection 14 between its side walls and the center portion. The metallic bottom closure 42 of the jacket 34 is in tight contact with the projecting portions 12, 14 of the bottom of the cupped electrode 10, but, as seen in Fig. 1, an annular space exists between the closure 42 and the bottom of the electrode 10. This space provides a reservoir for exudate should the electrode 10 rupture and moreover provides space for the bottom of the electrode to bulge into and thereby to relieve excess gas pressure should it develop, yet the bottom closure 42 will not itself be affected.

To guard against electrolyte corrosion and possible leakage occurring at the top of the cell of the invention, the underside of the metal member capping the carbon electrode is protected by a layer 52 of electrolyte-proof material, preferably of microcrystalline wax. This material effectively insulates the metal member against attack by the electrolyte or cell exudate and therefore prevents its destruction. The wax layer also lines the upper portions of the cupped electrode 10 which are above the top of the depolarizer mix 20 and protects them from corrosive attack, thereby tending to prevent gas formation caused by excessive attack on the electrode. Furthermore, the microcrystalline wax penetrates and fills minute crevices in the joints between the metallic closure and the top of the cupped electrode, and between the top of the jacket and the top of the cupped electrode, thereby effectively integrating all of the several elements of the top closure.

Although the construction of the dry cell of the invention is quite different from conventional construction, one of the principal advantages of the invention is that its manufacture is simple. The active elements of the cell, the cupped electrode, carbon electrode, depolarizer mix and electrolyte are all assembled in conventional manner.

The jacket may be produced by a lap or spiral-winding technique, the latter being preferred. In producing the jacket by the spiral-winding technique, three strips of kraft paper, two of which are coated with plastic, are fed to a conventional tube winding machine, provision being made for heating the thermoplastic coatings of the coated strips. The first coated strip is fed to the mandrel of the machine with the plastic side out; the second coated strip is fed to the machine with the plastic side in, and engaging the plastic coating of the first strip, so that by operation of the machine the softened plastic coatings are brought into contact with each other and sealed under heat and pressure into one continuous jointless ply. The third strip is fed and wound and adhered to the paper side of the second plastic coated strip in conventional manner and becomes the outer ply of the cell jacket. A suitable label may be wrapped about the finished jacket and preferably adhered to it by heat-sealing with a moisture-proof adhesive.

In production of cells embodying the invention, kraft paper strips 0.007 inch thick with plastic coatings 0.0007 inch thick have been used with complete success, the barrier ply of cell jackets made of such material being substantially 0.0014 inch thick.

The top end closure 46 of the jacket 34 is then spun in place, the top edges of the jacket and the marginal edges of the top closure being tightly curled together as indicated at 50 (Fig. 1). The cell assembly is then placed in the jacket 34, a quantity of heat-softenable electrolyte-proof material, preferably microcrystalline wax having been placed in the top of the cell beforehand, most conveniently by slipping a washer of wax over the carbon electrode before the metal cap is applied to it. The assembly of cell and container is now ready for closure, and the metal bottom closure 42 is put in place and its marginal edges and the bottom edges of the jacket 34 are tightly curled about each other as shown at 44 (Fig. 1). To distribute the electrolyte-proof layer 52 along the underside of the top closure, the assembly is now heated in an inverted position, preferably by induction heating. The assembly is then turned on its side and spun so that the heat-softened wax is uniformly distributed. This entire operation may be conducted by placing inverted cell assemblies on a moving belt, passing them through a heating zone, tipping the heated cells over, permitting them to roll down an inclined plane and finally allowing them to stand in an inverted position until the softened wax has solidified.

Cells embodying the invention have been thoroughly tested. Such tests conducted on cells provided with jackets in which the barrier ply was of a vinyl chloride-vinyl acetate copolymer, have demonstrated that the cells are substantially leakproof under the most severe conditions of abuse. For example, cells were placed in flashlights of commercial production, and the flashlight switches held closed for periods of time up to three months, except for periodic inspection of the cells and flashlights. Similar tests were made under the same conditions with dry cells of conventional construction. Cells made according to this invention showed little if any leakage of liquid, no bulging and caused no damage to the flashlight after 94 days. Cells of conventional construction leaked badly in two days and bulged so badly that they could not be removed from the flashlight casing without severe damage to the case, after 72 days.

In other tests, not in flashlight cases, cells embodying this invention showed little if any leakage of liquid and no bulging 33 days after a short circuit test, whereas cells of a construction modified to impart some measure of leak resistance bulged and leaked seriously 4 days after the same test.

The results of tests such as those just reported emphasize the co-action of the various elements of the cell of the invention toward solving the leakage problem. For example, cells not provided with the bottom construction of the invention bulged badly at the bottom and in many cases were ruptured there. Other cells not having a continuous moisture-proof barrier in the cell jacket bulged badly at the sides. Still other cells not properly vented exhibited copious leakage. Thus, it is essential to the attainment of leak-proofness that top, bottom and side walls of the cell container be protected.

Other tests designed to demonstrate the ability of cell jackets to retain electrolyte without leakage comprises seating open tubes in asphalt, filling the tubes with electrolyte solution containing a wetting agent, left standing, and observing the time required for the tubes to show evidences of leakage. In such tests waxed tubes leaked in 6 hours, one tube from a commercially marketed "leak proof" dry cell leaked in 26 hours, but tubes embodying the present invention showed no leaks in two weeks.

Although several alternate forms of construction embodying the invention are illustrated in the drawing, other modifications within the scope of the invention will occur to those skilled in the art, and the invention is not limited to the constructions illustrated. Similarly, although in the discussion of test results above, specific reference is made to the use of a vinyl chloride-vinyl acetate copolymer for the barrier ply in the cell jacket of cells embodying the invention, it will be apparent that other thermoplastic electrolyte-impervious, film-forming resins may be used. A specific example of another vinyl derivative is vinylidene chloride.

What is claimed is:

1. In combination with a primary galvanic cell comprising a cupped consumable electrode, an immobilized electrolyte adjacent the inner surface thereof, a carbon electrode centrally disposed therein and extending outwardly the open end thereof; a depolarizer mix contacting said carbon electrode and occupying the space between said carbon electrode and said electrolyte; a substantially leakproof container comprising a composite, electrically non-conductive jacket composed of a plurality of plies sealed together to form a unitary wall for said cupped electrode, and top and bottom closures for said jacket, the end portions of said jacket and the marginal edge portions of said closures being tightly curled together in liquid-tight engagement; a layer of electrolyte-proof material forming an inner seal between said top closure and depolarizer mix and extending completely across the cross-section of said cell between said electrodes; said bottom closure being of metal in contact with said cupped electrode; said top closure having a metallic member electrically insulated from at least one electrode; the innermost ply of said jacket in contact with said cupped electrode being of bibulous paper to absorb exudate from said cell; an intermediate barrier ply of said jacket being of electrolyte impermeable organic resinous material effective to bar transmission of such exudate through the walls of said jacket and the outermost ply of said jacket being of paper and serving to support said intermediate barrier ply and strengthen said jacket when said innermost ply is wet with such exudate; said jacket and top and bottom closures thereof sealing said cell; and exudate reservoir space between the bottom of said cupped electrode and said bottom closure.

2. In combination with a primary galvanic cell comprising a cupped consumable metal electrode; an immobilized electrolyte adjacent to the inner surfaces of said cupped electrode; a carbon electrode centrally disposed in said cupped electrode and extending outwardly of the open end thereof; a depolarizer mix in contact with said carbon electrode and said immobilized electrolyte; and a flanged metal terminal cap mounted on the end of said carbon electrode, said terminal carrying an electrically insulating washer on the flanged portion thereof; a substantially leakproof container comprising a multi-ply, composite, electrically non-conductive jacket composed of a plurality of piles sealed together to form a unitary wall for said cupped electrode and metallic top and bottom closures for said jacket, the end portions of said jacket and the marginal edge portions of said closures being tightly curled together in liquid-tight engagement; said top closure having an aperture centrally disposed therein adapted to permit said carbon electrode to pass therethrough, the edge of the aperture engaging said washer and thereby being insulated from said metal terminal cap, at least one projection between said bottom closure and the bottom of said cupped electrode providing electrical contact therebetween, and in conjunction therewith providing a reservoir space for the reception of exudate from said cell; the innermost ply of said multi-ply jacket in contact with said cupped electrode being of bibulous material whereby to absorb exudate from said cell; an intermediate barrier ply of said jacket being a continuous, electrolyte-impermeable film of organic resinous material effective to bar transmission of such exudate through the walls of said jacket, and the outermost ply of said jacket being of electrically non-conductive material and serving to support said barrier ply and to strengthen said jacket when said innermost ply is wet with such exudate; and a layer of micro-crystalline wax forming an inner seal between said top closure and depolarizer mix, and extending completely across the cross-section of said cell between said electrodes underlying said metal terminal cap and metal cap closure, and in contact therewith insulating said cap and closure from said electrolyte; said top and bottom closures sealing said cell.

References Cited in the file of this patent

UNITED STATES PATENTS

| | | |
|---|---|---|
| 2,169,702 | Marsal | Aug. 15, 1939 |
| 2,244,016 | Marsal | June 3, 1941 |
| 2,396,693 | Glover | Mar. 19, 1946 |
| 2,552,091 | Glover | May 8, 1951 |
| 2,580,664 | Drummond | Jan. 1, 1952 |
| 2,642,470 | Reinhardt et al. | June 16, 1953 |
| 2,707,200 | Urry et al. | Apr. 26, 1955 |